(12) United States Patent
Kumar

(10) Patent No.: US 6,188,481 B1
(45) Date of Patent: Feb. 13, 2001

(54) SPATIAL INTERFEROMETRY

(75) Inventor: Balbir Kumar, Wembley (GB)

(73) Assignee: Marconi Electronic Systems Limited, Middlesex (GB)

(*) Notice: Under 35 U.S.C. 154(b), the term of this patent shall be extended for 0 days.

(21) Appl. No.: 09/202,947

(22) PCT Filed: Jul. 3, 1997

(86) PCT No.: PCT/GB97/01801

§ 371 Date: Apr. 16, 1999

§ 102(e) Date: Apr. 16, 1999

(87) PCT Pub. No.: WO98/01767

PCT Pub. Date: Jan. 15, 1998

(30) Foreign Application Priority Data

Jul. 4, 1996 (GB) .................................................. 9614041

(51) Int. Cl.[7] .................................................... G01B 9/02
(52) U.S. Cl. .......................................... 356/489; 356/495
(58) Field of Search .................................. 356/345, 349, 356/351

(56) References Cited

U.S. PATENT DOCUMENTS 3,863,258   1/1975   Clark .

FOREIGN PATENT DOCUMENTS

| 40 04 611 A1 | 8/1991 | (DE) . |
| 2 039 187 | 7/1980 | (GB) . |
| 2 257 589 | 1/1993 | (GB) . |

OTHER PUBLICATIONS

Sung Lee et al., "Optimum Beamformers for Monopulse Angle Estimation Using Overlapping Subarrays", May 1994, pp. 652–657, 8082 IEEE.

Rolf Jakoby, A Novel Quasi–Optical Monopulse–Tracking system for Millimeter–Wave Application, Apr. 1996, vol. 44, No. 4, pp. 466–477, IEEE.

*Primary Examiner*—Robert Kim
(74) *Attorney, Agent, or Firm*—Venable; Robert J. Frank; Robert Kinberg

(57) ABSTRACT

An interferometer comprises a non-uniform beam splitter (34) which splits an incoming beam (30) of energy into two beams (36, 38). The two beams (36, 38) are taken from parts of the incoming beam (30) which overlap. The two beams (36, 38) are fed spacially separated energy feeds (44, 46) and then fed to a comparator to produce sum and difference channels (54, 58). The sum and difference channels (54, 58) are guided to a means for detecting a difference in phase (60) between the sum and difference channels (54, 58).

21 Claims, 6 Drawing Sheets

SPATIAL INTERFEROMETRY

This invention relates to interferometry and is particularly, but not exclusively, related to a single aperture quasi-optical spacial interferometer.

BACKGROUND OF THE INVENTION

The power radiated by an antenna generally varies with direction. A uniformly illuminated aperture has a radiation pattern having a power which varies with respect to angle according to the function $(\sin x/x)^2$ as shown in FIG. 1. The angle between half peak power points of a radiation pattern is usually defined as the angular beam-width which is shown as θ. Two identical targets are said to be resolved in angle if they are separated by more than the angular beam-width. It is difficult to determine the angular location of a target to an accuracy significantly better than the angular beam-width of an antenna. This is especially the case when the signal-to-noise ratio is low.

Tracking of targets which move with angular velocities requires determination of angular location having an angular accuracy greater than can be achieved using a straightforward single antenna system. Accuracy can be improved by using the technique of spatial interferometry which relies upon having more than one receiving antenna.

In this technique, signals which are received from an object or target are collected by a number of antennae and signals from each antenna are combined by using a comparator to produce a sum channel and a difference channel. The comparator may be a hybrid or an optical circuit. The sum channel produces an output which is the combination of the signals from the antennas. The difference channel produces an error voltage (having a plus or minus sign) which is approximately proportional to the angular deviation of the target from a notional centre line which is referred to as the bore-sight. The bore-sight is the electrical axis of the antenna beam which produces a null out of the difference channel. The sign of the error voltage is determined using a phase-sensitive detector and is used to determine the direction of the angular deviation from the bore-sight.

Spatial interferometry is used in astronomy and radar systems to improve resolution, track moving objects and determine range.

One particular application of spatial interferometry is a monopulse radar system. The term monopulse refers to a radar system which can obtain angular and range information from a single pulse. Such a system has an antenna which can have any number of antenna feeds, but four are commonly used which are placed at the focus of a cassegrainian or a lens system for the reception of signals from a target, normally a moving target A side view of such a system having an antenna (aperture) 10 and an array of horns 12 is shown in FIG. 2. The bore-sight is shown as broken line b. The radar system maintains the position of the target on bore-sight by using information provided by the difference channel to control servo-motors which move the antenna to maintain the target on bore-sight.

When a lens or reflector acts as a receiving antenna the echoes received from the target are not focussed to a point because of the wave nature of the radiation. The radiation is distributed in a diffraction pattern known as an Airy function, the exact nature of the function depending on the energy distribution in the aperture.

If an array of horns is placed in a common plane in the focal region of an antenna, the coupling of energy from free space into the cluster of horns is inefficient. This is because energy distribution in each horn is such that it is a maximum in the centre of the horn and decays towards the walls. Even when the horns are located close together the inefficiency due to coupling loss is large. An array of four horns illuminated by a single aperture has an intrinsic loss of several dB.

The array of horns 12 receives energy reflected or originating from a target. The energy distribution is maximum at the centre of the array of horns where the walls of adjacent horns meet and so coupling is inefficient.

SUMMARY OF THE INVENTION

Since antennae are reciprocal devices, in systems which use an array of horns to transmit as well as receive, the losses are further increased In such a system a separate intrinsic loss is incurred on both transmitting and receiving.

It is an object of the present invention to reduce inefficiency in coupling between focussing optics and detectors or receivers in an interferometer.

According to a first aspect the invention provides an interferometer comprising:

beam splitter means therefor having an aperature, the beam splitter means splitting an incoming beam of energy incident on the aperture into at least a first beam and a second beam, the first and second beams originating substantially from separate parts of the aperature;

first and second energy feeds for receiving said first and second beams the beam splitter means and the energy feeds being seperated by free space; and means for detecting a phase difference between the first and second beams;

characterised in that the regions of the aperature beam from which the first and second beams originate overlap.

According to a second aspect the invention provides a method of interferometry on an incoming beam of energy comprising the steps of directing the incoming beam of energy onto an aperture splitting the incoming beam of energy into at least a first beam and a second beam, the first and second beams being substantially obtained from separate regions of the aperture, feeding the first and second beams to respective energy feeds; and detecting a phase difference between the first and second beams characterised in that the regions of the aperature from which the first and second beams originate overlap.

By having overlapping energy distributions fed to the feeds, coupling between the first and second beams and the energy feeds can be efficient.

Preferably the energy is electromagnetic energy.

Preferably the first and second beams are fed to the energy feeds which are spatially separated, that is, not adjacent.

Preferably the incoming beam is split by a beam splitter means having a non-uniform splitting ratio from one side of an energy receiving area to the other side. Preferably the splitting ratio varies from a maximum value at said one side of the beam splitter means to a minimum value at said other side of the beam splitter means. It may change at a varying rate.

Preferably the incoming beam of energy is split into more than two beams. Most preferably the incoming beam is split into four beams.

Preferably the first and second beams are obtained from opposite sides of the incoming beam.

Since the first and second beams are obtained from separate, that is different, sides of the incoming beam, any phase information embodied in the incoming beam may be obtained and analysed.

Preferably the reflectivity of the beam splitter means changes across its surface. Alternatively another characteristic may change such as phase, polarisation, a magnetic or an electrical characteristic.

Preferably the splitting ratio varies in more than one direction across the surface. It may vary in orthogonal directions.

The beam splitter means may comprise a any of a number of variants. It may comprise plurality of wires which are spaced apart in a comb-like structure. The wires may be stretched over a frame or printed on a support. The spacing between adjacent wires may increase from one side of the comb-like structure to the other. A grid-like structure may comprise an overlapping pair of two comb-like structures at an angle to each other, for example at a right angle.

In another embodiment the beam splitter means may comprise a plurality of "dots", the concentration of dots per unit area varying across the beam splitter means. The variation may be in one or in two directions. The dots may be of any size and shape which is capable of splitting a beam when a sufficient concentration of dots is present.

The beam splitter means may be a wedge in which the splitting ratio at a point on the wedge is determined by the thickness of the wedge at that point. The beam splitter means may comprise a slotted structure having slots of varying depth.

The beam splitter means may have a magnetic permeability and/or a dielectric constant which varies across its surface. The beam splitter means may comprise a birefringent material.

The beam splitter means may be a bulk device of an electrical and/or magnetic type. It may be in the form of a plate, a screen, a sheet, a rod, a block or another construction.

An important characteristic of the beam splitter means is that it acts on a cross-section of the incoming beam to a variable extent across the incoming beam's cross-section. Although in some of the embodiments discussed the beam splitter means acts directly on the incoming beam to separate the first and second beams. In one embodiment the beam splitter means may not directly split the incoming beam but may change some characteristic across part of the incoming beam, for example, its polarisation. Separate beams may be resolved in a following step of the method or stage in the apparatus.

The beam splitter means may comprise more than one beam splitter. In a preferred embodiment there are two or more beam splitters, each beam splitter having a changing splitting ratio across its surface in one direction only. In this embodiment there may be three beam splitters.

Preferably the first and second beams are guided along respective waveguides to the means for detecting a phase difference. The waveguides may comprise a waveguide structure, such as hollow waveguides, micro strip or may be wavepaths for air or free space transmissions. The path lengths of the waveguides or wavepaths for the first and second beams differ by 180° ($\lambda/2$).

Preferably the means for detecting a phase difference comprises a hybrid junction which provides sum and difference channels and a phase sensitive detector which can determine the sign of an angle error signal. The hybrid junction may be a coupler such as a magic T.

Preferably energy is emanating from a target and is in a wavefront by the time it reaches a single aperture. The single aperture produces the incoming beam which travels to the beam splitter means.

Preferably the interferometer comprises a plurality of horns or detectors. It may comprise two, four or more horns or detectors.

Preferably the interferometer or method is used in a tacking system to track an object which is the source of the energy to be detected. The object may be generating or reflecting the incoming beam.

Preferably the interferometer is used in a radar tracking system. Alternatively, it may be used as a tracking system in other technical fields, for example in astronomy. In this latter case the object would be an astral body such as a galaxy, a star, planet, comet, asteroid or the like.

According to a third aspect the invention comprises a tracking system having an interferometer according to the first aspect of the invention.

BRIEF DESCRIPTION OF THE DRAWINGS

An embodiment of the invention will now be described by way of example only, with reference to the accompanying drawings in which.

DETAILED DESCRIPTION OF THE INVENTION

In the following reference is made to circuits being of an optical or a waveguide type. The term optical when referring to a circuit means that the energy is transmitted through free space. The term waveguide means that the energy is transmitted though a waveguide.

Figure 1:
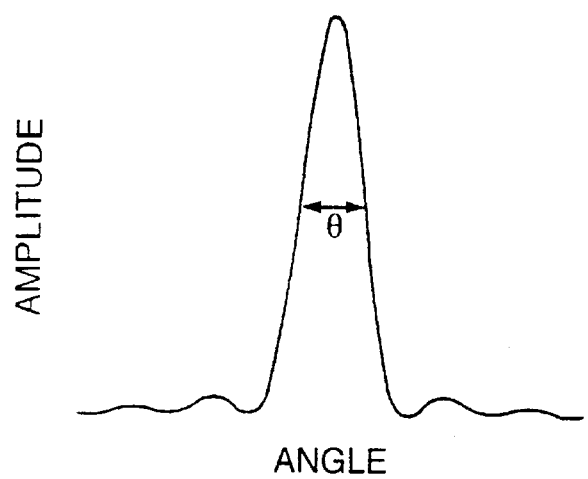
FIG. 1 shows an antenna pattern of power against angle.
Figure 2:
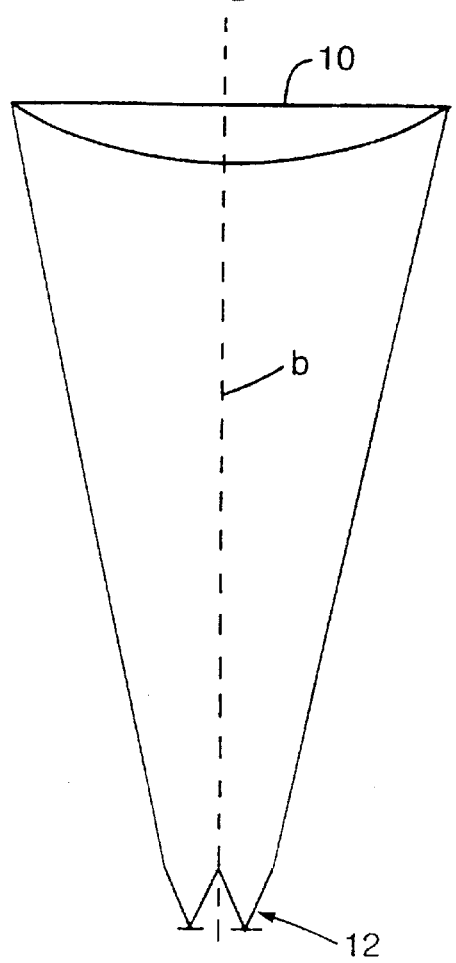
FIG. 2 shows a schematic representation of an antenna arrangement in a prior art radar.

FIG. 2 shows a prior art radar antenna arrangement which is used to determine the sign of the angular displacement of a target from bore-sight (the angle error). Collecting optics shown in this example as the antenna or lens 10) collect part of a wavefront which has been reflected by the target and focus it into an incoming beam and onto the array of horns 12. Conventionally four horns will be used in the cluster (for example—the arrangement of FIG. 6) although only two can be seen in FIG. 2. The horns are located above the focal plane of the antenna or lens 10. The antenna partially focuses the beam so that the coupling into the horns is optimised. Each horn collects a separate part of the partially focussed beam. The partially focussed beam is wide enough to be fed to different horns in the array. For a target on bore sight b, the magnitudes of signals detected by adjacent horns will be equal and in phase. For a target slightly off bore sight the phases will differ. The signals detected by adjacent horns are added and subtracted to give respective sum and difference channels. Comparison and processing of the sum and difference channels will enable angle error to be determined.

Figure 3:
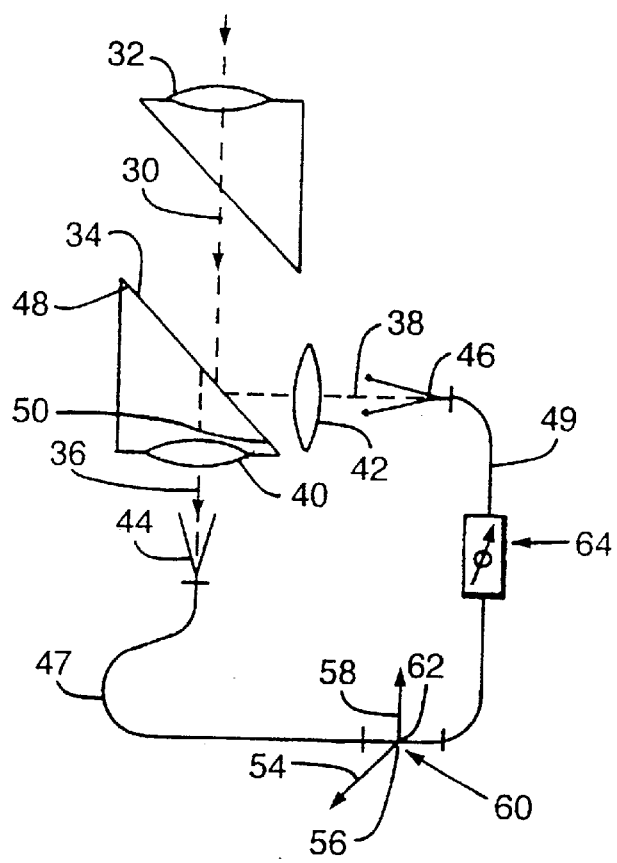
FIG. 3 shows a schematic representation of an interferometer according to the invention.

FIG. 3 shows an illustration of an interferometer which is described to illustrate the invention. An incident beam 30 emerges from collecting optics 32 and is focussed onto a beam splitter 34. The beam splitter divides the incident beam 30 into first and second beams 36, 38. The beams 36 and 38 pass through respective optics 40, 42 and are collected by horns 44, 46.

The beam splitter 34 is non-uniform, that is, it has a splitting ratio which varies across its surface. In this embodiment the ratio will vary from a high value at a first end 50 to a low value at a second end 48. As a consequence peak values of the first and second beams 36. 38 originate from separate parts of the incident beam 30 coming from a target. It should be noted that the energy distributions of the first and second beams 36, 38 partially overlap.

Figure 4:
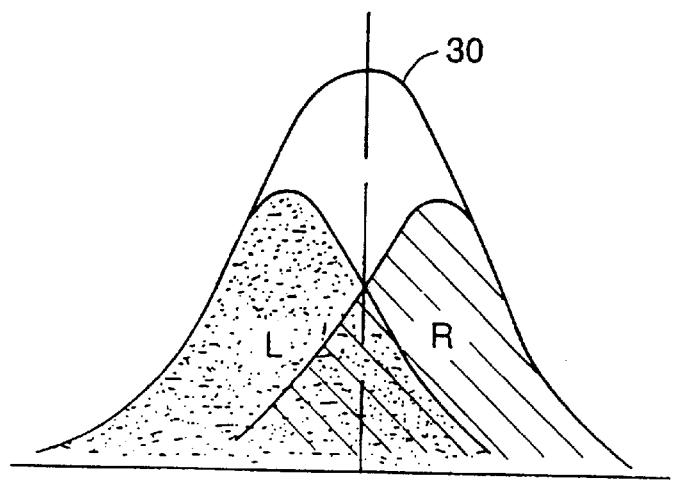
FIG. 4 shows how overlapping energy distributions of the first and second beams relate to the energy distribution of the incoming beam.

FIG. 4 shows that the energy distributions of the beams 36, 38 overlap. The sum of the beams 36, 38 is the incident beam 30. The energy distribution of the incident beam 30 across the focal plane can be considered as being made up of two beams (shown as L and R and equivalent to beams 36, 38) which are separated in space but overlap to some degree so that their combination produces the energy of the incident beam 30.

Figure 5:
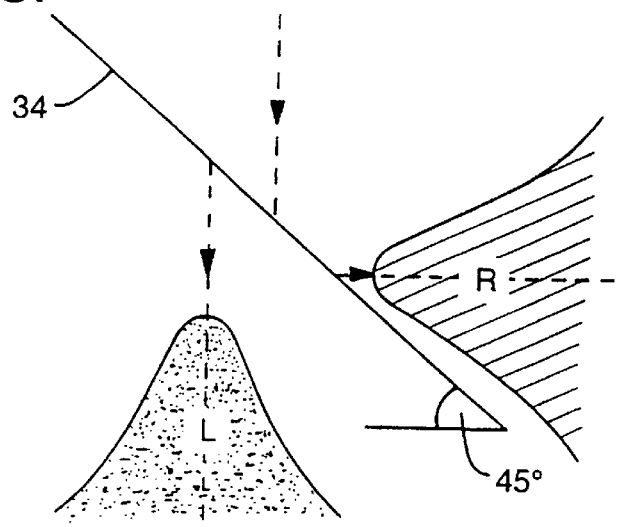
FIG. 5 shows splitting of the first and second beams.

The non-uniform beam splitter 34 separates the energy distribution of the incident beam 30 into two independent beams travelling to different collection points in space. As a result the total energy of incident beam 30 can be collected by horns which individually are matched for efficient coupling with each of the first and second beams. FIG. 5 shows the results of non-uniform beam splitter 34 having acted on incident beam 30.

The incident beam 30 is split using a non-uniform beam splitter which has a reflection coefficient which varies across its extent. In the 45° configuration shown in FIGS. 3 and 5, the beams can be made to travel in orthogonal directions and the energy collected using two horns each matched to one of the two beams This output from the horns can then be fed to a hybrid junction to produce the sum and the difference channels.

The beams 36 and 38 are guided by waveguides 47 and 49 into a hybrid junction 60, such as a magic T, which produces a sum channel 54 from a first port 56 and a difference channel 58 from a second port 62. A phase shifter 64 provides a necessary delay in beam 38 for the hybrid junction 60 to produce a null from the difference channel as a desired frequency when the target is on the bore-sight b.

The system of FIG. 3 splits the incoming beam 30 into two beams from which angle error in one dimension can be determined. In a more practical system the incoming beam is split into at least four beams so that angle error can be determined in two dimensions and an object can be tracked. Embodiments of two dimensional tracking systems are set out below.

The system shown in FIG. 3 is a hybrid circuit which is used for millimeter wavelength (such as in W-band).

Figure 6:
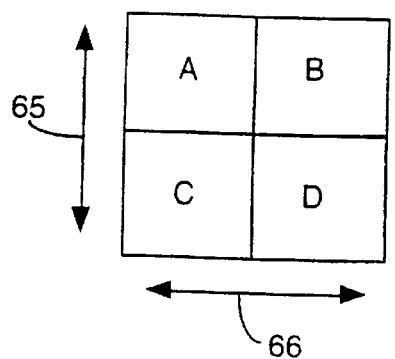
FIG. 6 shows an array of horns or feeds.
Figure 7:
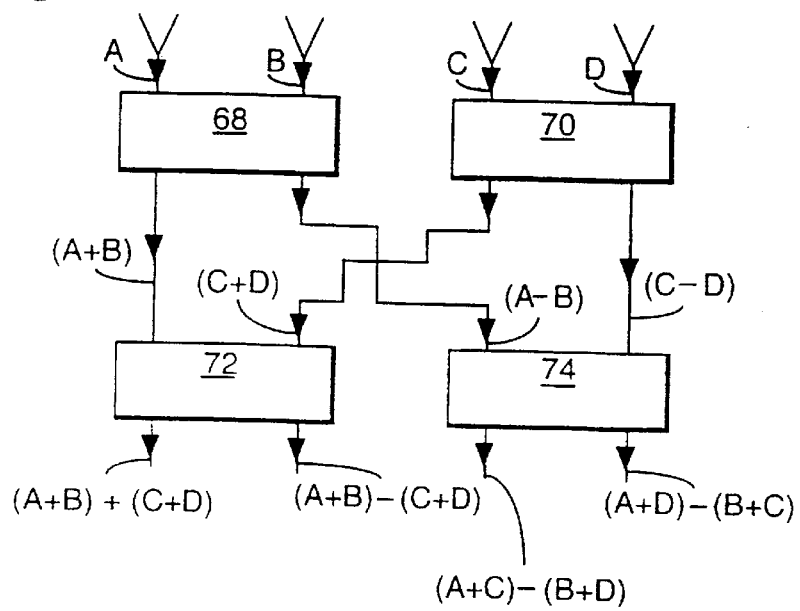
FIG. 7 shows a comparator which is used to obtain sum and difference channels from the feeds of FIG. 6.

FIGS. 6 and 7 show parts of a known system which is used to track in two dimensions. FIG. 6 shows an array of four horns or feeds A, B, C and D. The four horns would be configured as shown in FIG. 6 and directly illuminated by an incoming beam as shown in FIG. 2. The horns produce four signals A, B, C and D. FIG. 7 shows a comparator which is used to obtain the sun and difference channels.

Signals A and B are fed into hybrid circuit 68 which produces sum and difference channels A+B and A−B. Signals C and D are fed into hybrid circuit 70 which produces intermediate sum and difference channels C+D and C−D.

By passing the outputs from the hybrid circuits 68 and 70 into hybrid circuits 72 and 74 as shown in FIG. 7 the following sum and difference channels are obtained:

(A+B)+(C+D); (i)

(A+B)−(C+D); (ii)

(A+C)−(B+D); (iii)

and (A+D)−(B+C) (iv)

(i) is the sum channel, (ii) is the difference channel for elevation and (iii) is the difference channel for azimuth. The first three, (i), (ii) and (iii), are used to calculate azimuth and elevation angle error. The last, (iv), is usually ignored.

Figure 8:
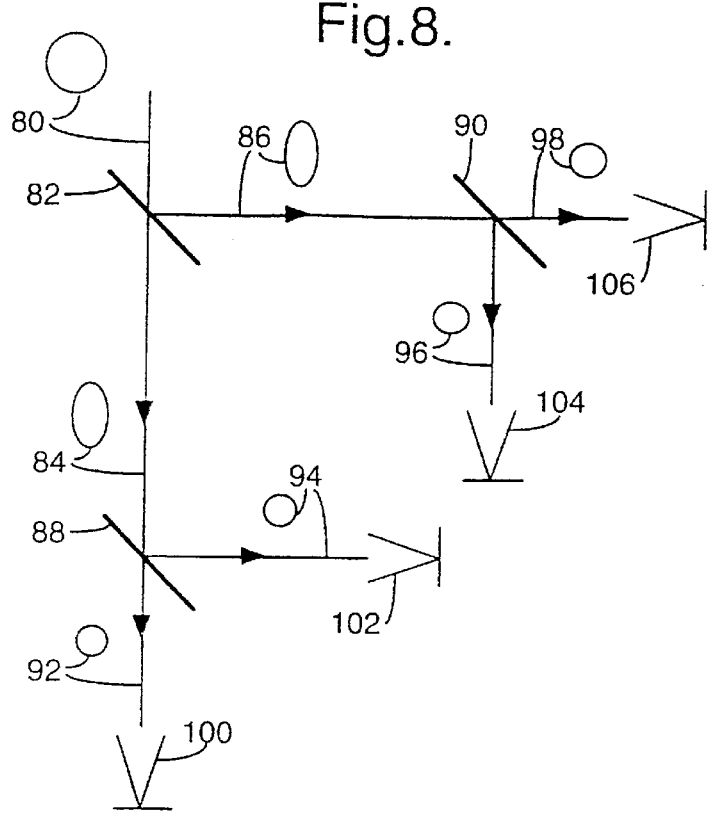
FIG. 8 shows an optical circuit which is used to split an incoming beam into four beams.

An optical circuit according to the invention is shown in FIG. 8. This can be used with the known comparator of FIG. 7. An incident beam 80 (of circular cross section) is produced by part of a wavefront passing through collecting optics (not shown). The incident beam 80 is split by a non-uniform beam splitter 82 into secondary beams 84 and 86 which are of elliptical cross section. The two elliptical secondary beams 84 and 86 are themselves split by non-uniform beam splitters 88 and 90 which are orientated at right angles to the beam splitter 82. The beam splitters 88 and 90 each produce two tertiary beams, 92 and 94 from beam splitter 88, and 96 and 98 from beam splitter 90. The tertiary beams are of circular cross section. They are fed into horns 100, 102, 104 and 106. Unlike horns A, B, C and D of FIG. 6 the horns 100, 102, 104 and 106 do not have to be clustered together in an array. Therefore coupling between a horn and its signal (A, B, C or D) may be optimised. Although this system would be suitable for radar at microwave frequencies it may operate instead at optical frequencies.

Figure 9:
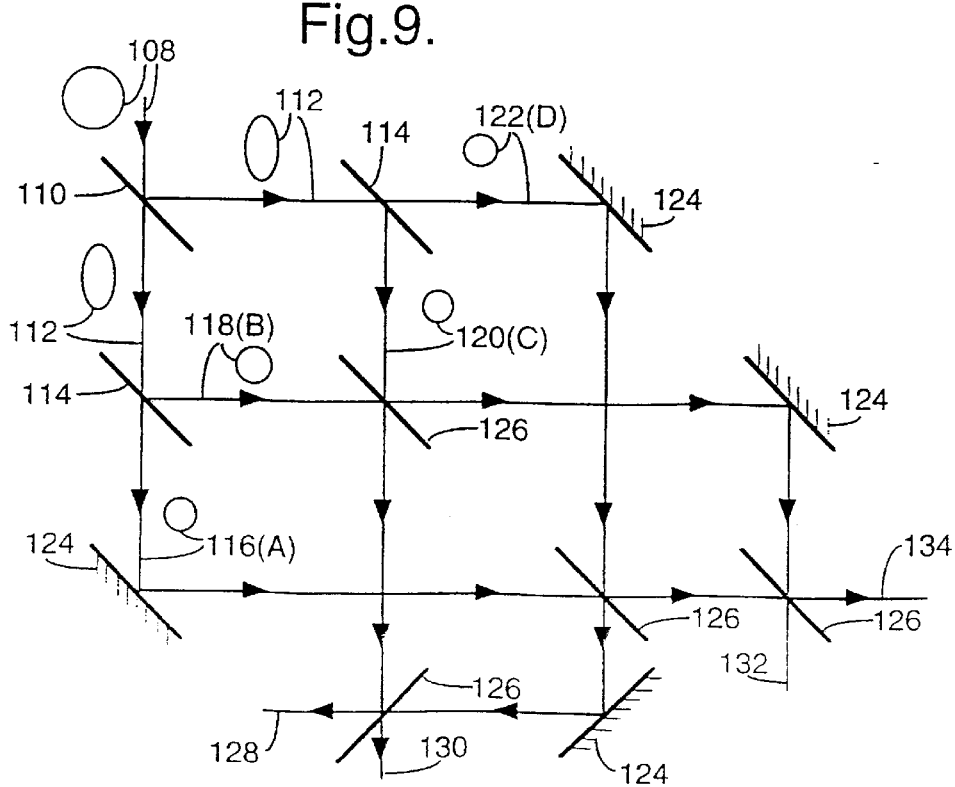
FIG. 9 shows an optical circuit which is used to produce sum and difference channels from an incoming beam.

FIG. 9 shows a system including an optical comparator. A beam of energy, such as light, 108 is split by a first non-uniform beam splitter 110 and the resulting secondary beams 112 are split further into tertiary beams 116, 118, 120 and 122 by non-uniform beam splitters 114. Collecting optics which produce beam 108 are not shown. In common with FIG. 8 the cross section of the beams changes from circular (initial) to elliptical (secondary) to circular (tertiary). Referring to the tertiary beams as A, B, C and D, it can be seen how the optical arrangement of reflectors 124 and beam splitters 126 produce output beams 128, 130, 132, and 134 which are the desired sum and difference channels:

(A+B)+(C+D) (beam 130)

(A+B)−(C+D) (beam 128)

(A+C)−(B+D) (beam 132)

Beam 134 is not usually required.

Beam splitters 126 are uniform across their surface and have a reflectivity of 50%. The path lengths from the non-uniform beam splitter 110 to the beam splitters 126 are arranged so as to provide constructive and destructive interference of beams emerging from the beam splitters 126. This results in sum and difference channels being created.

By using components such as rooftop reflectors in the optical circuit, beam splitter 126 can be replaced by a polarising grid which can split a beam incident upon it.

The sum and difference channels can then be used to track a target. The system of FIG. 9 does not need a separate comparator because the sum and difference channels are automatically created by the optical circuit. Such an optical interferometer can be used in astronomy for tracking.

In the systems of FIGS. 8 and 9, three non-uniform beam splitters are employed. In another embodiment of the invention a single two dimensional beam splitter is used which has a non-uniform splitting ratio across its surface in two orthogonal directions. This provides a system which is simpler and more compact As a result the beam splitter will split an initial incident beam into four secondary beams. The four secondary beams can be used in an interferometer which tracks in two dimensions (azimuth and elevation).

Figure 10:
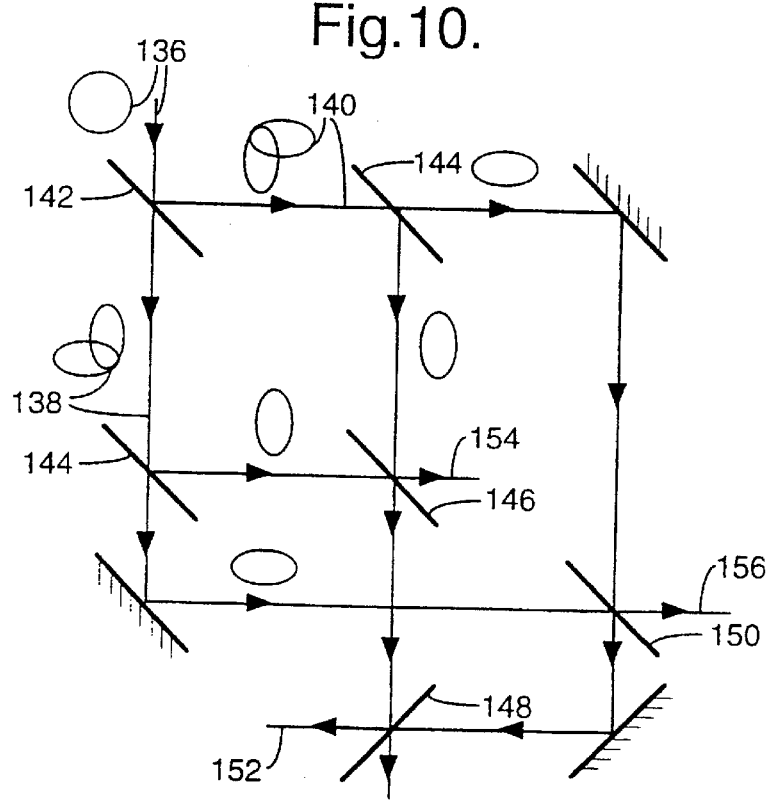
FIG. 10 shows another optical circuit which is used to produce sum and difference channels from an incoming beam.

An example of a system using a two-dimensional non-uniform beam splitter is shown in FIG. 10. Although it shows an optical system, it may equally apply to a radar system.

An initial beam 136 (of circular cross section) is produced by part of a wavefront passing through collecting optics (not shown). The initial beam 136 is split into secondary beams 138 and 140 by a two-dimensional non-uniform beam splitter 142. The beam splitter 142 has a variation in reflectivity across its surface. The variation is sensitive to polarisation and varies in two orthogonal directions (across its surface), one for each polarisation, that is, it varies in a horizontal direction for vertically polarised radiation and varies in a vertical direction for horizontally polarised radiation.

The incident beam 136 is linearly polarised at 45° and can be resolved into a vertical and a horizontal component. Each component will be split by the non-uniform beam splitter 142 independently of the other. Thus the vertically polarised component will be split into two vertically polarised beams, one transmitted and one reflected. Similarly, the horizontally polarised component will be split into two horizontally polarised beams, one transmitted and one reflected. Thus from the non-uniform beam splitter two elliptical beams will be transmitted, one vertically and one horizontally polarised, and two elliptical beams will be reflected, one vertically and one horizontally polarised (as shown in FIG. 10 by numerals 138 and 140).

Alternatively the incident beam 136 may be circularly or elliptically polarised, which can also be resolved into horizontally and vertically polarised components.

Each secondary beam comprises a pair of elliptical beams having a horizontally polarised beam and a vertically polarised beam. The elliptical beams have some degree of overlap as indicated by numerals 138 and 140 of FIG. 10. The horizontally and vertically polarised beams in each secondary beam 138 and 140 can easily be separated by passing the secondary beam through a polarising grid 144 such that one elliptical beam is transmitted and one reflected.

Four elliptical beams can then be combined through a set of beam splitters 146, 148 and 150 to produce sum and difference channels to be processed to determine angle error in azimuth and elevation.

Alternatively a system similar to that shown in FIG. 10 could be based on components which are unresponsive to the polarisation state of an incoming beam. In such a system, shown in FIG. 11, an incoming beam 160 has no preferred polarisation. The incoming beam is incident upon a beam splitter which has a variation in reflectivity which varies in two dimensions such that it transmits a two-dimensional off-axis beam 164, (which can be considered as being made up of two partially overlapping elliptical beams) and also reflects a two-dimensional off axis beam (166 which can also be considered as being made up of two partially overlapping elliptical beams).

These beams can be split further by beam splitters 168 having a variation in reflectivity in two orthogonal directions. The beam splitters 168 produce four off-axis elliptical beams 170, 172, 174, 176 which can be combined through a set of beam splitters 178, 180, 182 to produce the sum and difference channels which are required to determine the angle error in azimuth and elevation.

Figure 11:
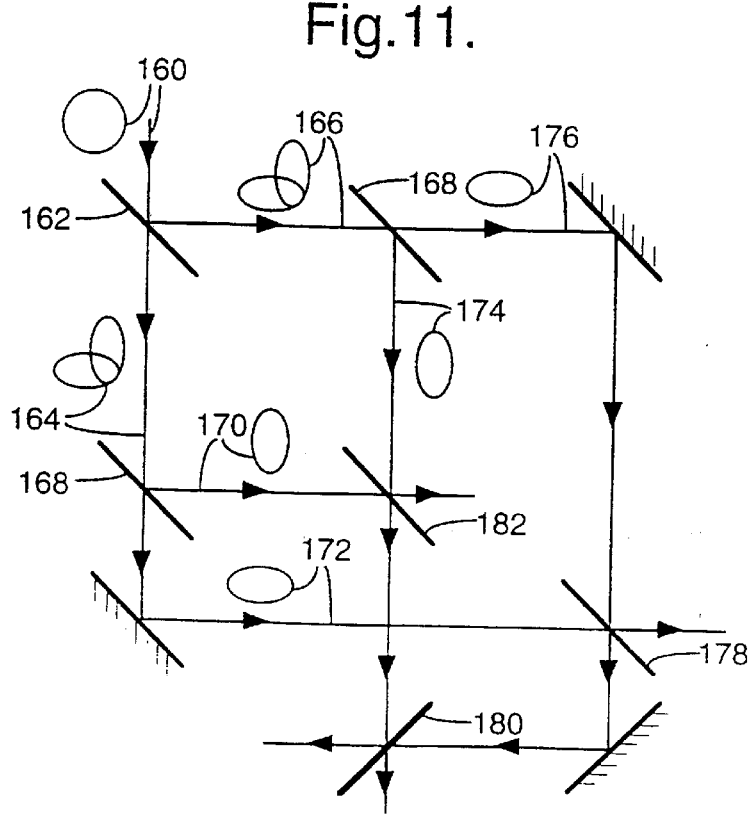
FIG. 11 shows yet another optical circuit which is used to produce sum and difference channels from an incoming beam.

As shown in FIGS. 10 and 11 the elliptical beams which interfere at beam splitters 148 and 180 have elliptical major axes which are orthogonally orientated In order to obtain optimum performance one of the elliptical beams should be rotated through 90° so that the elliptical major axes of the two elliptical beams coincide.

Although in FIGS. 8, 9, 10 and 11 beams of energy leaving the non-uniform beam splitters 82, 110, 114, 142, 162, 168 are shown as originating from the same parts of the surface of the beam splitters, this is a schematic representation only. The beams leaving the beam splitters would originate from separate regions across the beam splitter as is shown in FIG. 5.

Figure 12:
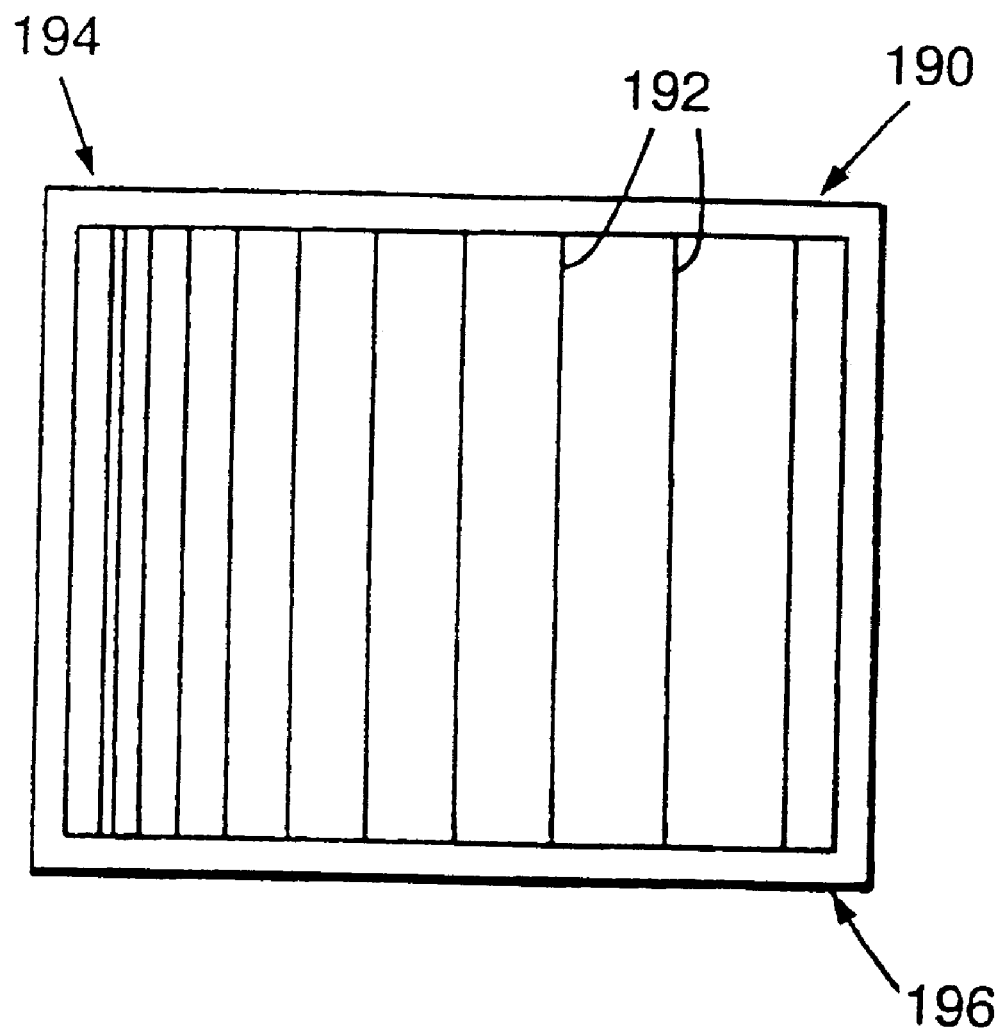
FIG. 12 shows a beam splitter.

In an embodiment used in a radar interferometer a non-uniform beam splitter 190 comprises a row of wires parallel to one another as shown in FIG. 12. The wires may be tungsten wires of 10 μm diameter. The amounts of reflection and transmission are determined by the spacing and the thickness of the wires 192. By having a spacing which increases from a first end 194 to a second end 196, the reflectivity varies from a maximum to a minimum across the beam splitter 190. Therefore an incoming beam is split into two secondary beams. To split an incoming beam into four tertiary beams a set of three such beam splitters would be used, as is shown in FIGS. 8 and 9. In an embodiment which has a splitting ratio varying in two orthogonal directions to split an incoming beam into four beams there may be two rows of parallel wires orientated at right angles to each other so as to form a grid. Such a beam splitter would be used in the system shown in FIG. 10. The system of FIG. 11 can use non-uniform beam splitters 162 and 168 which have a concentration of conductor patterns ("dots") whose density varies across the surface of the non-uniform beam splitter in two orthogonal directions thus providing a variation in reflectivity along those two directions.

The non-uniform beam splitter may be a substrate carrying a reflecting surface having a reflectivity which varies across its surface in one direction or two orthogonal directions. Alternative embodiments of beam splitters may comprise patterns of conductors printed on dielectric material, wedges of dielectric or magnetic material or dielectric or magnetic material carrying slots of varying depth. A non-uniform beam splitter may be constructed from materials having varying dielectric constant or magnetic permeability across its surface. Choice of beam splitter would depend on the application and frequencies of operation, whether at microwave or at optical frequencies.

An alternative to a non-uniform beam splitter having a non-uniform reflectivity across its surface is a polarisation rotation device, in which angle of rotation varies across the aperture. Consequently, the polarisation of the incoming beam varies across its extent from most or all substantially unrotated at one side of the incoming beam to substantially all rotated at the other side of the incoming beam. This will enable and incoming beam which passes through the polarisation rotation device to comprise components having orthogonal polarisations. These can be further split by a wire grid or a polarisation sensitive surface. Alternatively a single horn can be used which picks up the two orthogonal polarisations which can be separated in a waveguide structure.

Non-uniform phase shifting circuits can be used to rotate the direction of polarisation in a non-uniform manner across the aperture.

The same effect can be obtained using non-uniform polarisation rotation devices based on the principle of Faraday rotation.

A suitable configuration of polarisation rotation devices and conventional splitters can be arranged to provide 1 dimensional or 2 dimensional tracking.

An array of beam splitters can be constructed This array can act as integral detector in free space or placed in the focal plane of a lens. The array can consist of one dimensional or two dimensional non-uniform beam splitters. This could be used in an imaging system. Alternatively it could be used in a non-moving tracking system having a plurality of angularly displaced antennae with a tracked target moving from bore sight on one antenna to bore sight on another.

An interferometer can also be constructed by combining the non-uniform beam splitters of a reflection type with non-uniform polarisation rotation devices.

In the one dimensional interferometer that has been considered the incident beam is circular in cross-section. This beam is then split into secondary beams with elliptical cross-sections. However, if the incident beam is elliptical in cross-section then the splitting axis can be chosen such that the secondary beams are circular in cross-section.

In the foregoing embodiments, the interferometer may comprise a system which is configured to transmit energy as well as receive it. This is the case in a radar system. In such a transmit/receive system a circulator (either of an optical or waveguide type) can be added in the sum channel so that the system can transmit as well as receive.

The systems shown in FIGS. 8, 9 and 10 are illustrated as receivers. Of course, as mentioned above, they may also be used as transmitters. In such a case, on transmission, the non-uniform beam splitters would act as beam combiners and would combine circular beams into elliptical beams or elliptical beams into circular beams. In this way the systems could be used as a means of changing the shape of a beam. This feature may comprise an independent aspect of the invention.

By calculating the magnitude and sign of the angle error the antennae can be moved or tuned to bring the target back onto bore sight. In this way the target can be tracked.

Although the embodiment described above is related to optical and radar applications, the invention is not so limited. It may have applications for radiation of other wavelengths for which a partially reflecting surface can be manufactured.

In the foregoing description embodiments have been described which are suitable for scanning in one or two dimensions. It has been stated that a single non-uniform beam splitter which splits an incident beam into two resultant beams can be used to scan in one dimension and two non-uniform beam splitters (or a single non-uniform beam splitter having optical characteristics which vary across its surface in orthogonal directions) which splits an incident beam into four resultant beams can be used to scan in two dimensions. However, it is possible for a system for scanning in two dimensions to use a single non-uniform beam splitter which splits an incident beam into two resultant beams only. In such an embodiment each resultant beam is fed into a pair of energy feeds such as horns, antennae or the like disposed one above the other. In this arrangement if the E-fields of the energy feeds are vertically disposed then there will be uniform coupling of energy along a vertical line from the top energy feed to the bottom energy feed rather than there being a null-point at the junction of the energy feeds. Therefore such pairs of energy feeds can collect energy of the resultant beams in an energy efficient manner. Outputs from the four energy feeds can be fed into hybrid junctions (or some other detector of amplitude and/or phase difference) to produce the sum and the difference channels used to determine azimuth and elevation as is well known in the art. One advantage of this arrangement is that only one non-uniform beam splitter is required. Another advantage is that it can be used with existing hybrid junctions and thus is suitable for retro-fitting into existing systems.

What is claimed is:

1. An interferometer comprising:

beam splitter means having an aperture, the beam splitter means splitting an incoming beam of energy incident on the aperture into at least a first beam and a second beam, the first and second beams originating substantially from separate regions of the aperture;

first and second energy feeds for receiving said first and second beams, the beam splitter means and the energy feeds being separated by free space; and means for detecting a phase difference between the first and second beams;

wherein the regions of the aperture from which the first and second beams originate overlap.

2. An interferometer according to claim 1 wherein the first and second beams are fed to the energy feeds which are spatially separated.

3. An interferometer according to claim 1, wherein the beam splitter means has a non-uniform splitting ratio from one side of its aperture to the other side.

4. An interferometer according to claim 1 wherein the reflectivity of the beam splitter means changes across its surface.

5. An interferometer according to claim 1 wherein the splitting ratio varies in more than one direction across the surface.

6. An interferometer according to any preceding claim wherein the first and second beams are obtained from opposite sides of the incoming beam.

7. An interferometer according to claim 1 wherein the first and second beams are fed into respective pairs of adjacent energy feeds disposed such that there is no null-point at the junction of the adjacent energy feeds.

8. An interferometer according to claim 7 wherein it comprises a single beam splitter which splits the beam only into first and second beams.

9. An interferometer according to claim 1 wherein the incoming beam of energy is split into more than two beams.

10. An interferometer according to claim 1 wherein the incoming beam is split into four beams.

11. An interferometer according to claim 1 or claim 10 wherein the beam splitter means comprises more than one beam splitter.

12. An interferometer according to claim 11 wherein there are three beam splitters each beam splitter having a changing splitting ratio across its surface in one direction only.

13. An interferometer according to claim 1 wherein the beam splitter means acts directly on the incoming beam to separate the first and second beams.

14. An interferometer according to claim 1 wherein the beam splitter means comprises an optical device which does not split the incoming beam but changes a characteristic across part of the incoming beam to produce a modified beam and a splitter which splits the modified beam.

15. An interferometer according to claim 1 wherein the first and second beams are guided to the means for detecting a difference by a waveguide structure.

16. An interferometer according to claim 1 wherein the first and second beams are guided to the means for directing a phase difference through free space.

17. A tracking system comprising an interferometer as claimed in claim 1.

18. A tracking system according to claim 17, wherein an incoming signal to said tracking system comprises a radar signal.

19. A method of interferometry on an incoming beam of energy comprising the steps of:

directing the incoming beam of energy onto an aperture splitting it into at least a first beam and a second beam, the first and second beams being primarily obtained from separate parts of the aperture, propagating the first and second beams through free space to respective energy feeds, and detecting a phase difference between the first and second beams, wherein the parts of the incoming beam from which the first and second beams originate overlap.

20. An interferometer according to claim 1, said beam splitter comprising a single beam splitter that produces the first and second beams, and said first and second energy feeds comprising two pairs of adjacent energy feeds, each of the beams being split by one of the pair of energy feeds.

21. An interferometer according to claim 1, wherein each of said first and second beams, split from the incoming beam by said beam splitter means, is fed to a single energy feed.

* * * * *